United States Patent [19]
Rösch et al.

[11] Patent Number: 5,929,185
[45] Date of Patent: Jul. 27, 1999

[54] COPOLYMERS OF ALK-1-ENES AND α, ω-DIENES HAVING A HIGH VISCOSITY INDEX

[75] Inventors: Joachim Rösch, Ludwigshafen; Helmut Mach, Heidelberg; Freddy Gruber, Offenbach, all of Germany

[73] Assignee: BASF Aktiengesellschaft, Ludwigshafen, Germany

[21] Appl. No.: 08/866,260

[22] Filed: May 30, 1997

[51] Int. Cl.$^6$ .............................. C08F 236/20; C07C 2/30
[52] U.S. Cl. ........................ 526/336; 526/160; 585/10; 585/18; 585/507; 585/512
[58] Field of Search .................... 526/336, 160; 585/507, 508, 512, 10, 18; 524/579

[56] References Cited

U.S. PATENT DOCUMENTS

| | | | |
|---|---|---|---|
| 3,984,610 | 10/1976 | Elston | 526/169 |
| 5,371,260 | 12/1994 | Sangokoya et al. | |
| 5,391,793 | 2/1995 | Marks et al. | |
| 5,416,177 | 5/1995 | Siedle et al. | 526/336 X |
| 5,565,130 | 10/1996 | Omeis et al. | |
| 5,578,743 | 11/1996 | Ho et al. | 585/10 |
| 5,670,595 | 9/1997 | Meka et al. | 526/336 |

FOREIGN PATENT DOCUMENTS

| | | |
|---|---|---|
| 284 708 | 10/1988 | European Pat. Off. . |
| 317 240 | 5/1989 | European Pat. Off. . |
| 621 279 | 10/1994 | European Pat. Off. . |
| 621 293 | 10/1994 | European Pat. Off. . |
| 663 264 | 1/1995 | European Pat. Off. . |
| 91/069882 | 7/1991 | WIPO . |
| 95/06669 | 3/1995 | WIPO . |

OTHER PUBLICATIONS

Prog. Polym. Sci., 1991, 16, 443 J. Organometallic Chemistry, 369, 1989, pp. 359–370.

*Primary Examiner*—Fred Teskin
*Attorney, Agent, or Firm*—Keil & Weinkauf

[57] ABSTRACT

Copolymers have a viscosity index VI of more than 160 and comprise

A) from 99.0 to 99.99 % by weight of $C_2$–$C_{20}$-alk-1-enes and

B) from 0.01 to 1.0% by weight of $C_5$–$C_{20}$-α,ω-dienes having isolated double bonds.

8 Claims, No Drawings

COPOLYMERS OF ALK-1-ENES AND α, ω-DIENES HAVING A HIGH VISCOSITY INDEX

DESCRIPTION

The present invention relates to copolymers having a viscosity index VI of more than 160 and comprising A) from 99.0 to 99.99% by weight of $C_2$–$C_{20}$-alk-1-enes and B) from 0.01 to 1.0% by weight of $C_5$–$C_{20}$-α,ω-dienes having isolated double bonds.

The present invention furthermore relates to processes for the preparation of such copolymers and to their use as viscosity improvers in lubricants and engine oils.

Viscosity improvers based on polyisobutene, polyalkyl ethacrylates or hydrogenated styrene/butadiene block copolymers are generally added to lubricants and engine oils.

EP-A 621 293 describes comb polymers of hydrogenated olefin copolymer macromonomers and (meth)acrylate monomers and their use as oil additives. However, the disadvantage here is that the olefin copolymer macromonomers have to be prepared in separate reaction steps and that (meth)acrylates are generally susceptible to hydrolysis owing to their ester group.

It is an object of the present invention to provide viscosity improvers which do not have the stated disadvantages, can be easily prepared, especially with regard to process engineering, and comprise inert hydrocarbons and are therefore stable to hydrolysis.

We found that this object is achieved by the copolymer as defined at the outset.

We have also found processes for their preparation and their use as viscosity improvers in lubricants and engine oils.

For the preparation of the novel copolymers, from 99.0 to 99.99, preferably from 99.5 to 99.95, in particular from 99.7 to 99.9, % by weight of $C_2$–$C_{20}$-alk-1-enes are used as monomers A). $C_6$–$C_{12}$-alk-1-enes, such as hex-1-ene, hept-1-ene, oct-1-ene, non-1-ene, dec-1-ene, undec-1-ene and dodec-1-ene, as well as mixtures of different $C_2$–$C_{20}$-alk-1-enes, preferably mixtures of $C_2$–$C_4$-alk-1-enes with $C_6$–$C_{12}$-alk-1-enes, such as mixtures of ethene and dec-1-ene or ethene and oct-1-ene or of oct-1-ene and dec-1-ene, are preferred. Oct-1-ene, dec-1-ene or dodec-1-ene is particularly preferably used.

For the preparation of the novel copolymers, from 0.01 to 1.0, preferably from 0.05 to 0.5, in particular from 0.1 to 0.3, % by weight of $C_5$–$C_{20}$-α,ω-dienes having isolated double bonds are used is as monomers B). Acyclic $C_6$–$C_{10}$-α,ω-dienes such as 1,5-hexadiene, 1,6-heptadiene, 1,7-octadiene, 1,8-nonadiene and 1,9-decadiene, are preferred. 1,8-Nonadiene or 1,7-octadiene is particularly preferably used. It is also possible to use mixtures of different $C_5$–$C_{20}$-α,ω-dienes having isolated double bonds.

The novel copolymers can be prepared by polymerization in the gas phase, in suspension, in solution or in liquid monomers. They are preferably prepared by polymerization in solution or in liquid monomers.

The polymerization conditions are not critical per se; in general, polymerization is carried out at from −50 to 300° C., preferably from 0 to 250° C., at from 0.5 to 3000, preferably from 1 to 2500, bar for from 0.1 to 24, preferably from 0.2 to 10, hours.

The novel copolymers are prepared in the presence of a catalyst system. Examples of suitable catalyst systems are the Ziegler-Natta catalyst systems, which are generally known and are described, for example, in Prog. Polym. Sci. 16 (1991), 443. In addition to a titanium-containing solid component, Ziegler-Natta catalyst systems also contain, inter alia, a cocatalyst, suitable cocatalysts being aluminum compounds. An electron donor compound is preferably used as a further component of the cocatalyst, in addition to this aluminum compound.

The novel copolymers are preferably prepared in the presence of a catalyst system which contains, as active components, a metallocene complex and a compound forming metallocenium ions.

Particularly suitable metallocene complexes are those of the general formula I

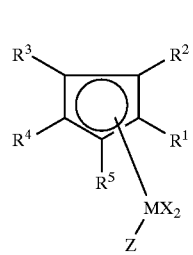

where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —$OR^6$ or —$NR^6R^7$, $R^6$ and $R^7$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, $R^1$ to $R^5$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, it also being possible for two adjacent radicals together to form a saturated or unsaturated cyclic group of 4 to 15 carbon atoms, or $Si(R^8)_3$, $R^8$ is $C_1$–$C_{10}$-alkyl, $C_3$–$C_{10}$-cycloalkyl or $C_6$–$C_{15}$-aryl, Z is X or

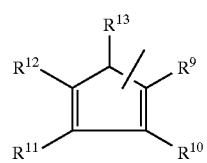

$R^9$ to $R^{13}$ are each hydrogen, $C_1$–$C_{10}$-alkyl, 5-membered to 7-membered cycloalkyl, which in turn may carry $C_1$–$C_{10}$-alkyl as a substituent, $C_6$–$C_{15}$-aryl or arylalkyl, it also being possible for two adjacent radicals together to form a saturated or unsaturated cyclic group of 4 to 15 carbon atoms, or $Si(R^{14})_3$, $R^{14}$ is $C_1$–$C_{10}$-alkyl, $C_6$–$C_{15}$-aryl or $C_3$–$C_{10}$-cycloalkyl, or $R^4$ and Z together form a group —$R^{15}$—A—,

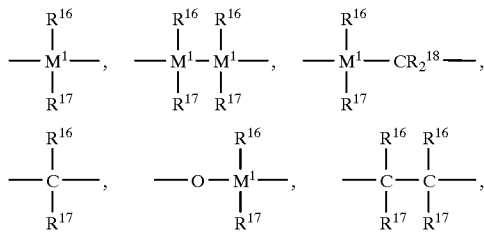

=$BR^{16}$, =$AlR^{16}$, —Ge—, —Sn—, —O—, —S—, =SO, =$SO_2$, =$NR^{16}$, =CO, =$PR^{16}$ or =$P(O)R^{16}$, $R^{16}$, $R^{17}$ and $R^{18}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or two adjacent radicals together with the atoms linking them form a ring, and $M^1$ is silicon, germanium, or tin, and

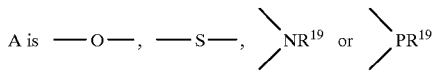

$R^{19}$ is $C_1$–$C_{10}$-alkyl, $C_6$–$C_{15}$-aryl, $C_3$–$C_{10}$-cycloalkyl, alkylaryl or $Si(R^{20})_3$, and $R^{20}$ is hydrogen, $C_1$–$C_{10}$-alkyl, $C_6$–$C_{15}$-aryl, which in turn may be substituted by $C_1$–$C_4$-alkyl, or $C_3$–$C_{10}$-cycloalkyl or $R^4$ and $R^{12}$ together form a group —$R^{15}$—.

Preferred metallocene complexes of the general formula I are

Ia

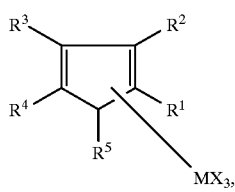

Ib

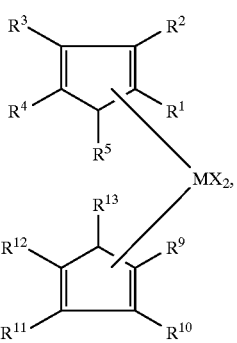

Ic

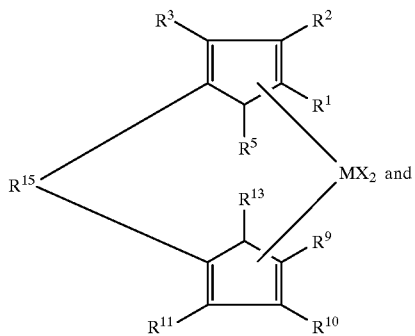

Id

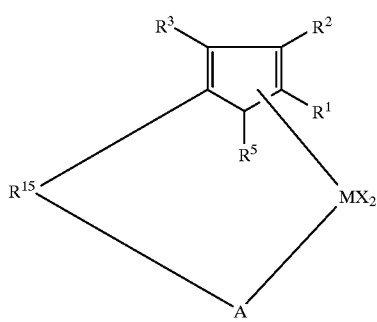

The radicals X may be identical or different but are preferably identical.

Particularly preferred compounds of the formula Ia are those in which

M is titanium, zirconium or hafnium,

X is chlorine, $C_1$–$C_4$-alkyl or phenyl and $R^1$ to $R^5$ are each hydrogen or $C_1$–$C_4$-alkyl.

Preferred compounds of the formula Ib are those in which

M is titanium, zirconium or hafnium,

X is chlorine, $C_1$–$C_4$-alkyl or phenyl, $R^1$ to $R^5$ are each hydrogen, $C_1$–$C_4$-alkyl or $Si(R^8)_3$ and $R^9$ to $R^{13}$ are each hydrogen, $C_1$–$C_4$-alkyl or $Si(R^{14})_3$.

The compounds of the formula Ib in which the cyclopentadienyl radicals are identical are particularly suitable.

Examples of particularly suitable compounds include bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
  and the corresponding dimethylzirconium compounds.

Particularly suitable compounds of the formula Ic are those in which $R^1$ and $R^9$ are identical and are each hydrogen or $C_1$–$C_{10}$-alkyl, $R^5$ and $R^{13}$ are identical and are each hydrogen, methyl, ethyl, isopropyl or tert-butyl, $R^2$, $R^3$, $R^{10}$ and $R^{11}$ $R^3$ and $R^{15}$ are each $C_1$–$C_4$-alkyl, $R^2$ and $R^{10}$ are each hydrogen or two adjacent radicals $R^2$ and $R^3$ on the one hand and $R^{10}$ and $R^{11}$ on the other hand together form a cyclic group of 4 to 12 carbon atoms,

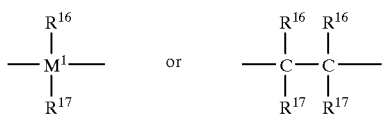

M is titanium, zirconium or hafnium and

X is chlorine, $C_1$–$C_4$-alkyl or phenyl.

Examples of particularly suitable complex compounds include dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(3-tert-butyl-5-methylcyclopentadienyl) zirconium dichloride, dimethylsilanediylbis(3-tert-butyl-5-ethylcyclopentadienyl) zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(3-methyl-5-methylcyclopentadienyl) zirconium dichloride, dimethylsilanediylbis(3-ethyl-5-isopropylcyclopentadienyl) zirconium dichloride, dimethylsilanediylbis(2-methylindenyl)zirconium dichloride, dimethylsilanediylbis(2-methylbenzindenyl)zirconium dichloride, dimethylsilanediylbis(2-ethylbenzindenyl)zirconium dichloride, methylphenylsilanediylbis(2-ethylbenzindenyl)zirconium dichloride, methylphenylsilanediylbis(2-methylbenzindenyl) zirconium dichloride, diphenylsilanediylbis(2-methylbenzindenyl)zirconium dichloride, diphenylsilanediylbis(2-ethylbenzindenyl)zirconium dichloride, and dimethylsilanediylbis(2-methylindenyl)hafnium dichloride and the corresponding dimethylzirconium compounds.

Particularly suitable compounds of the general formula I*d* are those in which

M is titanium or zirconium,

X is chlorine, $C_1$–$C_4$-alkyl or phenyl,

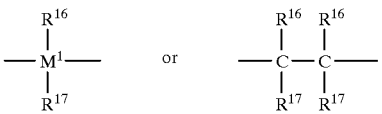

A is 

and $R^1$ to $R^3$ and $R^5$ are each hydrogen, $C_1$–$C_{10}$-alkyl, $C_3$–$C_{10}$-cycloalkyl, $C_6$–$C_{15}$-aryl or $Si(R^8)_3$, or two adjacent radicals form a cyclic group of 4 to 12 carbon atoms.

The synthesis of such complex compounds can be carried out by methods known per se, the reaction of the appropriately substituted, cyclic hydrocarbon anions with halides of titanium, zirconium, hafnium, vanadium, niobium or tantalum, being preferred.

Examples of appropriate preparation processes are described, inter alia, in J. Organometal. Chem. 369 (1989), 359–370.

Mixtures of different metallocene complexes may also be used.

Suitable compounds forming metallocenium ions are strong, neutral Lewis acids, ionic compounds having Lewis acid cations and ionic compounds having Bronsted acids as cations.

Preferred strong, neutral Lewis acids are compounds of the general formula II $$M^2X^1X^2X^3 \qquad \mathrm{II}$$

where $M^2$ is an element of main group III of the Periodic Table, in particular B, Al or Ga, preferably B, and $X^1$, $X^2$ and $X^3$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred are compounds of the general formula II where $X^1$, $X^2$ and $X^3$ are identical, preferably tris(pentafluorophenyl)borane.

Suitable ionic compounds having Lewis acid cations are those of the general formula III

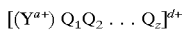

where

Y is an element of main groups I. to VI. or of subgroups I. to VIII. of the Periodic Table, $Q_1$ to $Q_z$ are radicals having a single negative charge, such as $C_1$–$C_{28}$-alkyl, $C_6$–$C_{15}$-aryl, alkylaryl, arylalkyl, haloalkyl or haloaryl, each having 6 to 20 carbon atoms in the aryl radical and 1 to 28 carbon atoms in the alkyl radical, or $C_1$–$C_{10}$-cycloalkyl, which may be substituted by $C_1$–$C_{10}$-alkyl, or halogen, $C_1$–$C_{28}$-alkoxy, $C_6$–$C_{15}$-aryloxy, silyl or mercaptyl, a is an integer from 1 to 6, z is an integer from 0 to 5 and d corresponds to the difference a-z, but d is greater than or equal to 1.

Carbonium cations, oxonium cations and sulfonium cations as well as cationic transition metal complexes are particularly suitable. Particular examples are the triphenylmethyl cation, the silver cation and the 1,1'-dimethylferrocenyl cation. They preferably have non coordinating opposite ions, in particular boron compounds, as also stated in WO 91/09882, preferably tetrakis (pentafluorophenyl)borate.

Ionic compounds having Brönsted acids as cations and preferably also non coordinating opposite ions are mentioned in WO 91/09882, a preferred cation being N,N-dimethylanilinium.

The amount of compounds forming metallocenium ions is preferably from 0.1 to 10 equivalents, based on the metallocene complex I.

Particularly suitable compounds forming metallocenium ions are open-chain or cyclic alumoxane compounds of the general formula IV or V

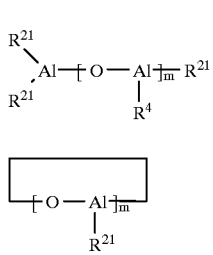

where $R^{21}$ is $C_1$–$C_4$-alkyl, preferably methyl or ethyl, and m is an integer from 5 to 30, preferably from 10 to 25.

The preparation of these oligomeric alumoxane compounds is usually carried out by reacting a solution of a trialkylaluminum with water and is described, inter alia, in EP-A 284 708 and U.S. Pat. No. 4,794,096.

As a rule, the oligomeric alumoxane compounds obtained are present as mixtures of both linear and cyclic chain molecules of different lengths, so that m is to be regarded as-an average value. The alumoxane compounds may also be present as a mixture with other metal alkyls, preferably with alkylaluminums.

Both the metallocene complexes and the compounds forming metallocenium ions are preferably used in solution, aromatic hydrocarbons of 6 to 20 carbon atoms, especially xylenes and toluene, being particularly preferred.

Aryloxyalumoxanes, as described in U.S. Pat. No. 5,391,793, aminoalumoxanes, as described in U.S. Pat. No. 5,371,260, aminoalumoxane hydrochlorides, as described in EP-A 633 264, silyloxyalumoxanes, as described in EP-A 621 279, or mixtures thereof may furthermore be used as the compound forming metallocenium ions.

It has proven advantageous to use the metallocene complexes and the oligomeric alumoxane compound in amounts such that the atomic ratio of aluminum from the oligomeric alumoxane compound to the transition metal from the metallocene complexes is from 10:1 to $10^6$:1, in particular from 10:1 to $10^4$:1.

In the process for the preparation of the novel copolymers, the catalyst systems may also be used in supported form.

Preferably used carriers are finely divided carriers which preferably have a particle diameter of from 1 to 300 μm, in particular from 30 to 70 μm. Examples of suitable inorganic carriers are magnesium chloride or silica gels, preferably those of the formula $SiO_2 \cdot a\, Al_2O_3$, where a is from 0 to 2, preferably from 0 to 0.5; these are therefore aluminosilicates or silica. Such products are commercially available, for example Silica Gel 332 from Grace. Examples of suitable organic carriers are finely divided olefins, for example finely divided polypropylene or poly-ethylene.

The process can be carried out either continuously or batchwise. Suitable reactors include continuously operated stirred kettles, it also being possible to use a number of stirred kettles connected in series (reactor cascade).

In a preferred procedure for the preparation of the novel copolymers, the monomers A) and B) are initially taken and are brought to a temperature of from –10 to 80° C. A solution of the catalyst system is then added, the temperature increasing as a result of the heat of polymerization. After the end of the polymerization, the reaction mixture is extracted, preferably by adding acids, and the organic phase is evaporated down.

It is also advantageous to meter the monomers A) and B) continuously into the reactor so that the concentration of the monomers A) and B) in the reactor is constant.

The novel copolymers have a viscosity index VI greater than 160, VI preferably being from 160 to 500, particularly preferably from 180 to 400, in particular from 200 to 350. The viscosity index is determined according to ISO 2909 in a 10% strength by weight solution by measurement of the solution viscosities at 40° C. and 100° C. and subsequent conversion according to the tables contained in the ISO standard. The solvent used is Solvent Neutral SN 100, a product of fractional mineral oil distillation, having a boiling range of from 230 to 280° C. and a viscosity (at 50° C.) of 14.8 mm²/sec (manufacturer: Wintershall Mineralöl GmbH).

The novel copolymers are distinguished by chemical inertness and good solubility in hydrocarbons, and they can be easily prepared with regard to process engineering and are suitable as viscosity improvers in lubricants and engine oils.

EXAMPLES

Examples 1 to 4:

Preparation of copolymers from dec-1-ene and 1,7-octadiene

Example 1:

500 g of dec-1-ene and 1.25 g of 1,7-octadiene (0.25% by weight) were initially taken in a 1 l flask and heated to 50° C. A solution of 42 mg of ethylidenebis(indenyl)zirconium dichloride in 34 ml of a 1.7 molar solution of methylalumoxane (MAO) in toluene was added to this. The internal temperature increased to 55° C. as a result of the heat of polymerization. After reaction time of 2 hours, the reaction mixture was extracted as 200 ml of 0.1N sulfuric acid and the organic phase was evaporated down in a rotary evaporator. 410 g of a highly viscose copolymer were obtained. Unreacting 1,7-octadiene was not detectable in the distillate.

Example 2:

The procedure was as in Example 1, except that 0.125% by weight of 1,7-octadiene was used instead of 0.25% by weight of 1,7-octadiene.

Example 3:

500 g of oct-1-ene and 1.25 g of 1,7-octadiene (0.25% by weight) were initially taken in a 1 l flask and cooled to 0° C. A solution of 45 mg of dimethylsilylbis(indenyl) zirconium dichloride in 34 ml of a 1.7 molar solution of methylalumoxane (MAO) in toluene was added to this. The internal temperature increased to 5° C. as a result of the heat of polymerization. After reaction time of 8 hours, the reaction mixture was extracted as 200 ml of 0.1N sulfuric acid and the organic phase was evaporated down in a rotary evaporator. 370 g of a highly viscose copolymer were obtained. Unreacting 1,7-octadiene was not detectable in the distillate.

Example 4:

The procedure was as in Example 3, except that 0.125% by weight of 1,7-octadiene was used instead of 0.25% by weight of 1,7-octadiene. 350 g of a highly viscose copolymer were obtained.

Comparative Example V1: Preparation of homopolymer of dec-1-ene

The procedure was as in Example 1, except that only dec-1-ene was initially taken, and no 1,7-octadiene. After the unreacted dec-1-ene had been distilled off, 390 g of viscose polydecene were obtained.

Comparative example V2: Preparation of homopolymer of oct-1-ene

The procedure was as in Example 3, except that only oct-1-ene was initially taken, and no 1,7-octadiene. After the unreacted oct-1-ene had been distilled off, 290 g of viscose polyoctene were obtained.

The properties of the resulting copolymers are shown in the table below.

The molecular weights $M_n$ (number average) and $M_w$ (weight average) were determined by means of gel permeation chromatography.

The viscosity index VI was determined according to ISO 2909 in a 10% strength by weight solution by measurement of the solution viscosities at 40° C. and 100° C. and subsequent conversion according to the tables contained in the ISO standard. The solvent used was Solvent Neutral SN 100, of product of fractional mineral oil distillation, having a boiling range from 230 to 280° C. and a viscosity (at 50° C.) of 14,8 mm²/sec (Wintershall Mineralöl GmbH).

TABLE

| Example | $M_n$ [g/mol] | $M_w/M_n$ | Viscosity at 40° C. [mm²/sec] | VI |
|---|---|---|---|---|
| 1 | 7500 | 2.1 | 7690 | 329 |
| 2 | 7900 | 2.2 | 8800 | 330 |
| 3 | 17600 | 2.2 | 77000 | 271 |
| 4 | 18600 | 2.1 | 82000 | 256 |
| V1 | 6000 | 2.4 | 4300 | 159 |
| V2 | 14700 | 2.5 | 65000 | 153 |

We claim:

1. A copolymer having a viscosity index VI of from 160 to 500 and comprising

A) from 99.5 to 99.95% by weight of $C_2$–$C_{20}$-alk-1-enes and

B) from 0.05 to 0.5% by weight of $C_5$–$C_{20}$-α,ω-dienes having isolated double bonds.

2. A copolymer as defined in claim 1, wherein from 99.5 to 99.95% by weight of $C_6$–$C_{12}$-alk-1-enes are used as monomers A).

3. A copolymer as defined in claim 1, wherein from 0.05 to 0.5 % by weight of $C_6$–$C_{10}$-α,ω-dienes having isolated double bonds are used as monomers B).

4. A process for the preparation of copolymers as defined in claim 1, wherein the monomers A) and B) are polymerized at from −50 to 300° C. and from 0.5 to 3000 bar in the presence of a catalyst system.

5. A process as defined in claim 4, wherein the catalyst system used is one which contains, as active components, a metallocene complex and a compound forming metallocenium ions.

6. A copolymer as defined in claim 1, comprising

A) from 99.7 to 99.9% by weight of $C_2$–$C_{20}$-alk-1-enes and

B) from 0.1 to 0.3% by weight of $C_5$–$C_{20}$-α,ω-dienes having isolated double bonds.

7. A copolymer as defined in claim 1 obtained by polymerization of monomers A) and B) at from −50 to 300° C. and from 0.5 to 3000 bar in the presence of a catalyst system which contains, as active components, a metallocene complex and a compound forming metallocenium ions.

8. A lubricant or engine oil containing a copolymer having a viscosity index VI of from 160 to 500 and comprising A) from 99.5 to 99.95% by weight of $C_2$–$C_{20}$-alk-1-enes and B) from 0.05 to 0.5% by weight of $C_5$–$C_{20}$-α,ω-dienes having isolated double bonds.

* * * * *

UNITED STATES PATENT AND TRADEMARK OFFICE
CERTIFICATE OF CORRECTION

PATENT NO. : 5,929,185
DATED : July 27, 1999
INVENTOR(S) : ROESCH et al.

It is certified that error appears in the above-identified patent and that said Letters Patent is hereby corrected as shown below:

On the title page, insert the following item:

--[30]  Foreign Application Priority Data
June 3, 1996    [DE]    Germany ............... 196 22 272 --.

Signed and Sealed this

Seventh Day of December, 1999

Attest:

Q. TODD DICKINSON

*Attesting Officer*   Acting Commissioner of Patents and Trademarks